Nov. 26, 1946.     W. T. STEPHENS     2,411,837
FULL CYCLE HYDRAULIC VALVE
Filed Sept. 28, 1944     4 Sheets-Sheet 1

Inventor
WILLIAM T. STEPHENS
By
Leach & Radue
Attorneys

Nov. 26, 1946.  W. T. STEPHENS  2,411,837
FULL CYCLE HYDRAULIC VALVE
Filed Sept. 28, 1944  4 Sheets-Sheet 3

Inventor
WILLIAM T. STEPHENS
Leech & Radue
Attorneys

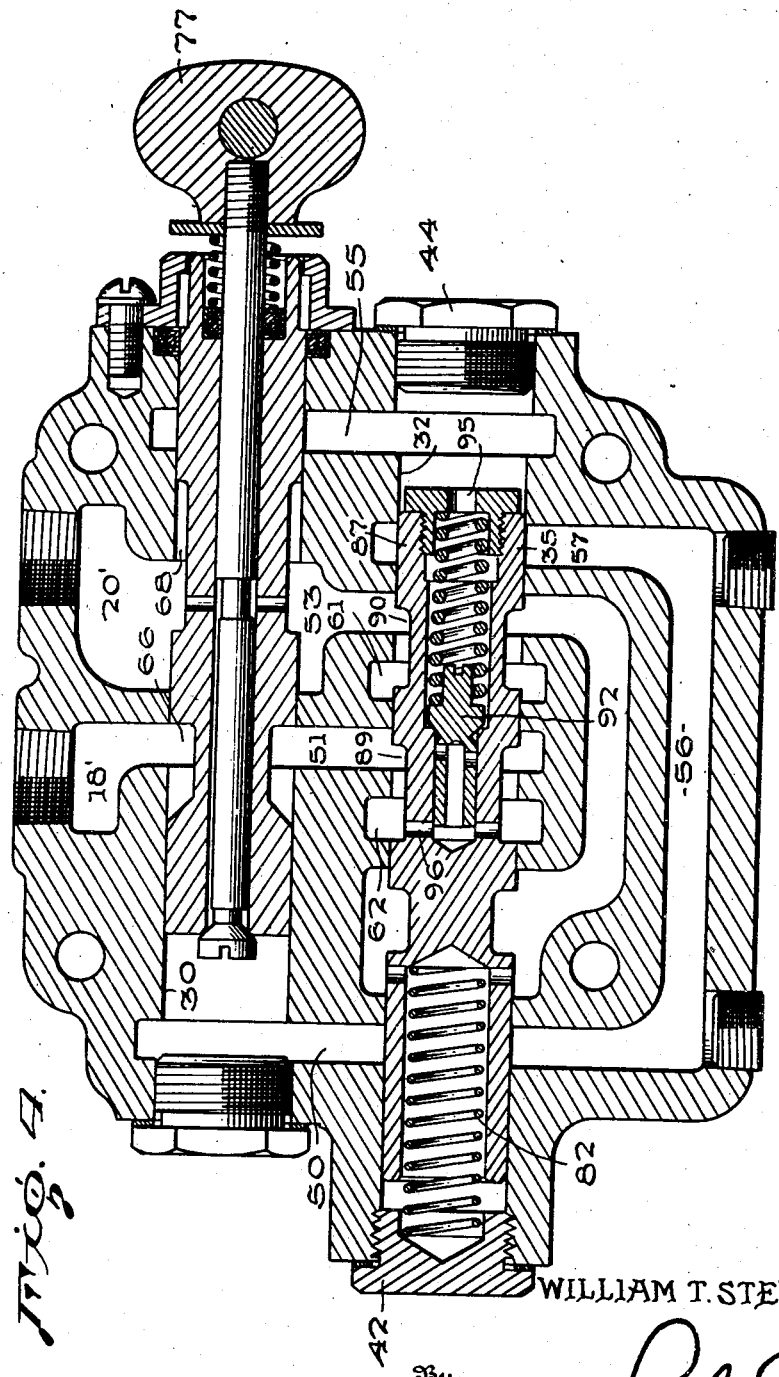

Patented Nov. 26, 1946

2,411,837

UNITED STATES PATENT OFFICE 2,411,837

FULL CYCLE HYDRAULIC VALVE

William T. Stephens, Cleveland, Ohio, assignor to Hydraulic Control Engineering Company, Cleveland, Ohio, a corporation of Ohio Application September 28, 1944, Serial No. 556,191

15 Claims. (Cl. 60—52)

This invention relates to automatic cycling hydraulic systems and to automatic full cycling valves for use with such systems.

It is a general object of the present invention to provide a novel and improved automatic cycling system for hydraulic presses or the like and a fully automatic cycling valve for use with same.

More particularly it is an object of the invention to provide a fully automatic cycling system for hydraulic presses and like devices in which the cycling is effected solely by changes in pressure in the operating liquid and without resort to mechanical association with any moving parts of the press.

Another important object of the invention consists in the arrangement of a fully automatic cycling valve arranged to be initiated in operation for each cycle by manual movement of a part thereof and to thereafter carry out the various phases of the cycle by pressure variation actuation of a movable plunger therein which also controls the flow of liquid for the operation of the press.

An important feature of the invention resides in the step-by-step movement of a control plunger as the fluid pressures delivered from the source increase and decrease, which plunger regulates the delivery of the liquid for operating the press throughout the several phases of its full cycle and which then resets the manually manipulated starting plunger ready for a further cycling operation.

Another important feature of the invention consists in the provision of an automatic cycling valve having a manually initiated operating plunger and an automatic pressure actuated control plunger together with a relief valve set to open when the pressure of the operating liquid becomes excessive, the fluid delivered from the relief valve providing for the actuation of the control valve.

A still further important feature of the invention consists in the stepped operation of the control valve by interrmittent pressure excesses each of which is quickly reduced as a result of the consequent movement of the relief valve to initiate another phase of the press operating cycle.

Other and further objects and features of the invention will be more apparent to those skilled in the art upon a consideration of the accompanying drawings and following specification wherein are disclosed two exemplary embodiments of the invention with the understanding that such modifications may be made therein as fall within the scope of the appended claims without departing from the spirit of the invention.

In said drawings:

Figure 4 is a further view similar to Figure 2 but illustrating the valve plungers in the power unloading positions, and Figure 5 is a fragmentary view of a modified form of the valve for use in a system where the source of power is an accumulator instead of a pump.

In the use of hydraulic machinery such as double acting rams, hoists, presses and the like, there are many occasions when it is desirable to control the entire cycle of operations with but a single initiating movement of the control mechanism. An example of this might be in the operation of a hydraulic press where, after initiating movement, the press plunger moves to the full extent permitted upon its downward stroke and is then automatically withdrawn and returned to a neutral or starting position and the control mechanism reset to stop movement of the press and prepare the assembly for another initiating operation. Many efforts have been made to provide a control of the type described, but most of them have been inefficient or too costly or complicated and most of them have depended, for full control of complete cycling, on some mechanical association with a moving portion of the press ram.

In accordance with the present invention a fully automatic independent control valve is provided which, upon an initiating operation, causes the press or ram to be extended to perform its work, to be retracted in the normal sequence of movement and then stopped after the cycle of movements has been completed. Furthermore, the valve then resets itself ready for another cycle. As the description proceeds it will be clear that the cycle control is not at all dependent on any timed sequence of events but rather is dependent on the changes in pressures resulting from the press plunger reaching the limits of its movements in either direction. These limits may be determined by the stroke of the press or the resistance of the material being operated on.

Figure 1:
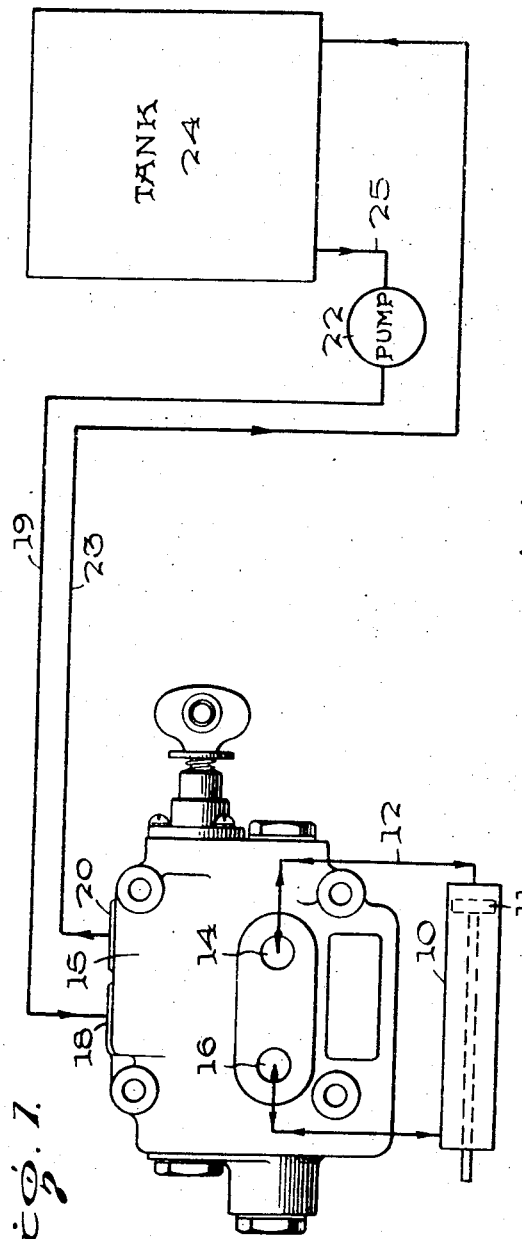
Figure 1 is a side elevational view of a full cycle hydraulic valve assembly constructed in accordance with the present invention and schematically illustrated as connected into a system including a hydraulic press or ram, a fluid pump and a tank or reservoir.

Referring now to the drawings for a better understanding of the invention and first to Figure 1, it will be seen that in the schematic portion of the view the cylinder of a hydraulic press, hoist or the like is shown at 10, with the plunger and its piston rod indicated in dotted lines at 11. Movement of this plunger to the left is considered, for the purposes of this description, as the loading or power stroke whereas movement to the right is the unloading stroke. The right hand end of the press cylinder which receives liquid to provide the loading stroke is connected by pipe 12 to port 14 in the housing of the fully automatic cycling valve 15 forming the subject matter of this invention. The opposite end of the press cylinder is likewise connected by a suitable pipe to valve housing port 16. The valve housing has two additional ports 18 and 20, the former being connected by pipe 19 to the discharge side of pump 22, which in most instances is of the constant volume, positive displacement type. Port 20 is connected by pipe 23 to a reservoir or tank 24 capable of holding a supply of liquid sufficient to at least fill the cylinder of the press. The pump 22 has its inlet pipe 25 connected to tank 24 whereby it is continuously supplied with liquid.

Figure 2:
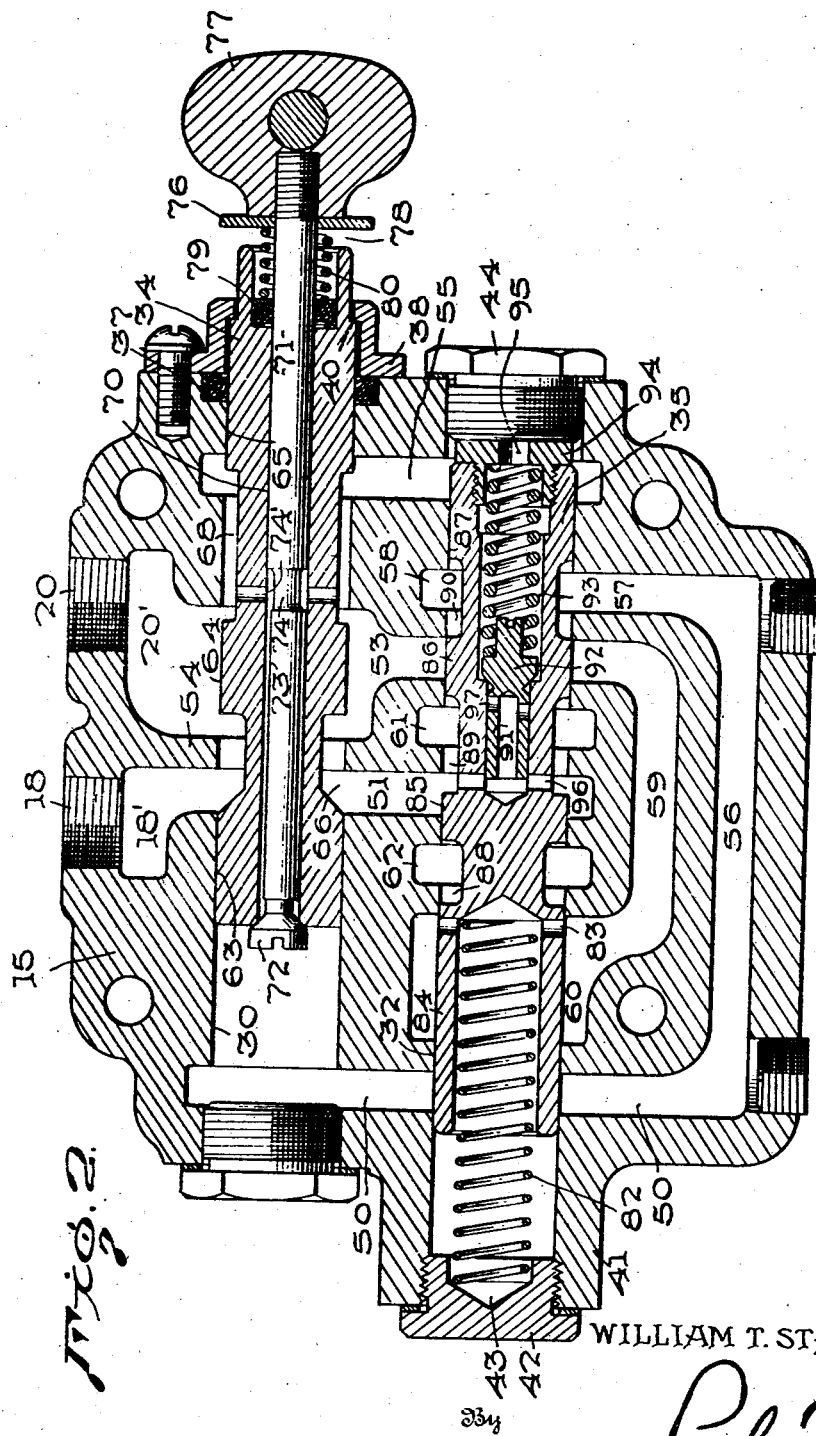
Figure 2 is a central vertical section through the valve assembly of Figure 1 illustrating the operating and control plungers of the same in the neutral or inoperative position.

In Figure 2 the valve assembly is illustrated in its entirety, the housing 15 being sectioned vertically through the centers of the two horizontal bores 30 and 32 therein which provide, respectively, for the reception and reciprocation of the cylindrical operating plunger 34 and the cylindrical control plunger 35.

The upper bore 30 extends clear through the valve housing and is closed at the left hand end by a screw plug. The right hand end of the bore at its junction with the outer surface of the housing is recessed to receive a fluid-tight packing 37 which is secured in position by a perforated cup-like member 38 having the added function of co-operating with a shoulder 40 on valve plunger 34 to limit its movement to the right, as illustrated in this figure.

The bore 32 likewise extends entirely through the housing, is somewhat longer at the left by virtue of the extension cast integral therewith at 41, and is closed at this end by a cap 42 having a well or recess 43, and at the right end by plug 44 forming a stop to limit the movement of the control plunger 35 to the right. In a similar manner the opposite end of the control plunger is, under certain conditions, stopped against the inner annular face of cap 42.

The upper bore 30 is intersected by a plurality of passages and ducts beginning with one at the extreme left end and numbered 50. Next toward the right is duct 51 extending upwardly into chamber 18' connected with the pump port 18. Next is duct 53 widening toward the top into chamber 20' connected to port 20. The narrow web 54 separates these ducts. The last or right hand passage 55 extends downwardly to the right hand end of bore 32.

Left hand vertical passage 50 extends around bore 32 so that it is not closed off by any portion of valve plunger 35 and joins horizontal passage 56 which connects into vertical passage 57 intersecting chamber 58 surrounding bore 32 immediately to the left of passage 55. Duct 53 extends around bore 32 and connects with horizontal passage 59 which leads to chamber 60 forming an enlargement of bore 32 just to the right of passage 50. Bore 32 is further intersected by chambers 61 and 62 connected respectively to valve housing ports 14 and 16 leading to the two sides of the hoist cylinder.

The operating plunger 34 comprises three sets of spaced lands 63, 64 and 65 each capable of completely closing off the bore against longitudinal flow. Lands 63 and 64 are spaced by circumferential groove 66 and lands 64 and 65 by circumferential groove 68. For its full length the operating plunger 34 is provided with a relatively small diameter bore 70 adapted to slidably accommodate a valve rod 71 having a close working fit therein. On its left hand end this rod mounts a poppet head 72 adapted to seat in the open end of bore 70 and close the same. The space of reduced diameter behind this head has communication with a groove 74 in valve rod 71 by virtue of a milled flat 73 between the two. Relative movement between the valve rod and the operating plunger 34 is permitted by spacing the stop washer 76, which is held in position on the end of the valve rod by operating knob 77, at a distance 78 from the reduced diameter end of the operating plunger. This reduced diameter is counter-bored to receive the packing 79 for the valve rod and for the spring 80 which not only maintains the poppet head 72 against its seat but positions the packing.

The control plunger is somewhat more complicated and has its left end hollow for a substantial distance to receive the spring 82 whose left end abuts the bottom of recess 43 in plug 42. This spring normally maintains the plunger against the inner face of plug 44 as shown in Figure 2. A plurality of radial holes 83 near the inner end of the spring receiving chamber in plunger 35 provides for movement of the liquid trapped in the end of bore 32 into chamber 60 which is at all times in communication with the tank, via 59, thus preventing liquid lock of the plunger. Valve plunger 35 has four sets of lands 84, 85, 86 and 87. Between 84 and 85 is groove 88. Between lands 85 and 86 is groove 89, and between lands 86 and 87 is groove 90.

The right hand end of plunger 35 is longitudinally bored and counter-bored, the smaller inner bore loosely receiving the hollow stem 91 of relief valve 92, the head of which seats at the junctions of the two bores. It is seated under the action of the heavy spring 93 housed in the larger bore and abutting against closure cap 94 in the end of the plunger. This cap is centrally perforated as at 95. The inner end of the smaller portion of the plunger bore is connected by radial ports 96 to groove 89. The hollow central portion of the plunger and the central passage in the relief valve are connected by radial ports 97 to the surface of the stem so that fluid passing longitudinally through the stem may move out into the larger bore which houses spring 93 when the valve is forced open under a pressure sufficient to cause spring 93 to yield.

The valve operates as follows, with the parts in the positions shown in Figures 1 and 2: Operation of the pump delivers liquid through pipe 19 and port 18 into chamber 18' where it passes to chamber 20' through groove 66 in operating plunger 34 which now spans these two chambers. In this neutral or bypassing position of this plunger no work is being performed and the pump is relieved of operating against any pressure, merely circulating the liquid to and from the tank. All passages and ports in the valve are assumed to be full of oil or other hydraulic fluid.

In order to initiate operation of the ram or press the operating knob or button 77 is pressed toward the left compressing spring 80, lifting poppet 72 from its seat and allowing oil trapped in closed chamber 30 to the left of plunger 34 to pass into bore 70 along the passage 73 into groove 74 and hence out through radial ports 74' into groove 68 communicating with chamber 20'. This permits continued pressure on knob 77 to move the operating plunger 34 to the left until washer 76 beneath the knob engages against the outer face of cup 38 stopping this operation. When the knob is now released the valve rod is moved to the right under the action of its spring 80 closing the poppet.

Figure 3:
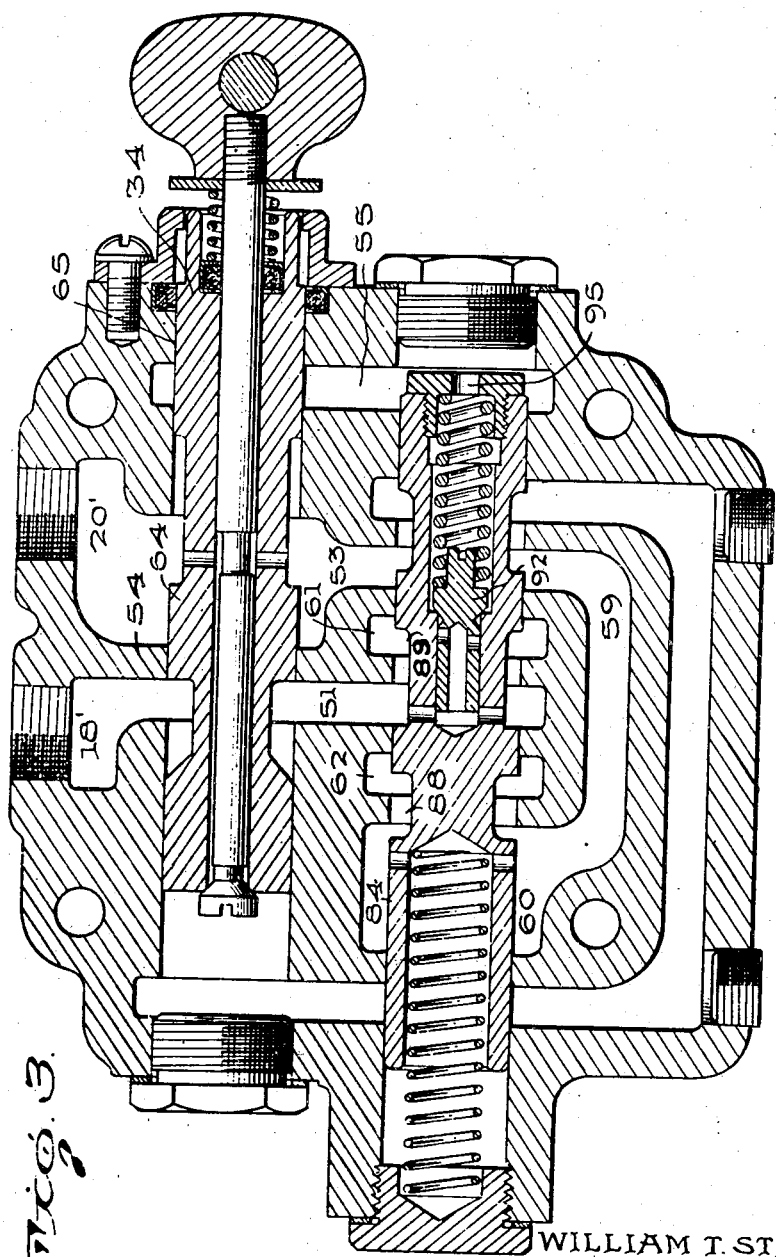
Figure 3 is a view identical with Figure 2 but illustrating the valve plungers in the positions required for the power loading operation of the press.

As seen in Figure 3, the first result of movement of the operating plunger 34 is to place land 64 in the opening in partition 54 and close off communication between 18' and 20' so that liquid pressure is built up in duct 51 by the action of the pump. At the same time land 65 now closes off communication between passage 55 and chamber 20'. High pressure fluid in 51 passes by way of groove 89 in control plunger into chamber 61 connected to hoist port 14 applying high pressure fluid to the right side of the ram plunger 11. The control plunger 35 is still in the position illustrated in Figure 2, and while high pressure fluid can be delivered to the ram none can be returned from the opposite side to permit it to move since chamber 62, connected to ram port 16, is completely closed off by lands 84 and 85 engaging in the bore 32 on both sides of the same. Continued operation of the pump with no flow builds up pressure in duct 51 which enters through radial ports 96, lifts relief valve 92 from its seat and permits this high pressure liquid to enter the spring chamber in the control plunger and issue through end port 95 therein and build up a pressure in passage 55 and the end of bore 32 which forces the control plunger 35 toward the left until it assumes the position indicated in Figure 3. Under these conditions land 84 has moved out of the bore 32 between chamber 60 and 62 and fluid can return from the ram or press by flowing into 62, through groove 88 into chamber 60 and thence through passage 59 and duct 53 to chamber 20' and back to the tank. The excess back pressure being relieved by flow of liquid to the ram, the relief valve 92 closes and control plunger remains stationary in the position shown in Figure 3 since the liquid at its right cannot escape.

This condition maintains during the full stroke of the ram or until its movement is resisted to an extent such that the pump pressure again builds up to a point where it can lift relief valve 92. This may happen if the load on the ram is too great, or when it reaches the end of the stroke and engages against the cylinder head. Whatever the cause, valve 92 is again lifted, high pressure fluid flows through port 95 and adjusts the control plunger toward the left until it assumes the position illustrated in Figure 4 conditioning the valve for returning the plunger of the ram.

The control plunger 35 has now moved sufficiently far to the left to cut off chamber 61 from duct 51 through which high fluid pressure enters and this duct is now connected through groove 89 with chamber 62 leading by way of port 16 to the opposite end of the ram. At the same time chamber 61 from the power end of the ram is now connected by way of groove 90 with duct 53 leading to chamber 20' and back to the tank. Under these conditions the direction of movement of the ram plunger is reversed and movement continues until it reaches the upper end of its stroke and is stopped against the upper cylinder head.

The pump pressure now again begins to build up and fluid passes from 51 through groove 89 into passages or ports 96 again lifting relief valve 92 from its seat and delivering a further quantity of oil into the right hand end of bore 32 moving the control plunger 35 to the left until it is stopped from further movement by cap 42. When this happens the land 87 at the extreme right of the control plunger moves to the left of the entrance to passage 57 which is already full of oil, and oil issuing from 95 at the end of the control plunger builds up the pressure in 57 and connected passages 56 and 50 as well as in the left hand end of operating plunger bore 30. This acts on the end of this later plunger and moves it to the right as far as is permitted by its limit stop. This movement of the operating plunger performs three functions. First, it returns it to its neutral position ready for the next operation. Second, it moves groove 66 to span chambers 18', 20', thus relieving the pump to deliver only to the tank. Third, it connects chamber 20' and passage 55 through groove 68 permitting the oil under pressure in the right end of the control plunger passage to flow back to the tank under the action of the spring 82 biasing the control plunger to the right so that this plunger now returns to its normal or neutral position. The parts are now all in the positions indicated in Figure 2 ready for recycling, which operation must be initiated by again pressing the knob 77 to the left and moving the valve rod and operating plunger.

It will be seen that except for the initial requirement for positioning the knob 77 to start the operation cycle, the valve assembly has automatically functioned to control their whole cycle and has performed all of this without further attention by the operator. Rates of movement of the press ram in either direction can be readily controlled by restricters or suitable valves where necessary. The number of parts in the automatic cycling valve has been maintained relatively small and their design is extremely simple and comparatively inexpensive. All parts of the valve housing can be made by casting, coring and drilling while all parts of the several plungers and stems can be made by simple boring and turning operations.

The device is compact and occupies but little more space than the usual manual control valve. No additional piping is required for its operation.

The single use of the invention as described in this specification has merely been exemplary and obviously many other situations for the valve are available. In addition to the operations which it performs as already described it has additional safety factors. Movement of the ram or plunger can be instantly stopped at any point in its power loading or power unloading strokes by manually retracting the operating plunger by pulling on its knob 77. This will return all parts to the position illustrated in Figure 2 in the same manner as described in the sequence following the power unloading operation, except that the operating plunger is moved manually instead of by pressure on its left end. Liquid for fill-in behind the left end of the plunger is available through 50, 56, 57, groove 90, duct 53 and the tank. The control plunger also assumes its neutral position and since in this position it prevents the return of fluid from the left end of the ram or the delivery of any fluid to that end of the ram, it will be seen to be locked in whatever position it has reached when stopped. Upon again initiating operation, by suitable pressure on knob 77, the ram will resume movement. If it is stopped on the loading stroke it will continue loading, but if it is stopped on the unloading stroke it will start loading and then resume its normal cycling.

To adapt the valve for use with accumulator systems where the source of high pressure fluid is an accumulator the simple changes illustrated in Figure 5 are all that are necessary. It will be appreciated that a through bypass in the neutral or inoperative position of the valve is undesirable, since it would permit unloading of the accumulator and not permit full utilization of the advantages of the same whereby the pump can be run intermittently instead of continuously as is customary where the accumulator is not used.

In Figure 5 chamber $18^2$ is connected by way of the port to the accumulators whereas chamber $20^2$ is connected to the tank 24 as in Figure 1. Duct $51^2$, however, is not continuous with or connected to $18^2$ as in Figure 2. The two are offset and slight modifications have been made in the groove $66^2$ in operating plunger $34^2$ primarily by extending it more to the left. In the neutral position of the operating plunger this groove $66^2$ spans $51^2$ and $20^2$ but shuts off passage $18^2$ by means of land $63^2$. This results in stopping any flow of fluid from the accumulator when the plunger is in the neutral position. There is no flow by this valve plunger until it moves to the operating position to the left, when groove $66^2$ spans $51^2$ and $18^2$ and is taken out of communication with $20^2$ which is separated now by means of land $64^2$. Under these conditions high pressure liquid can enter passage $51^2$ but is blocked from chamber $20^2$, going back to the reservoir. From here on the action of the valve is identical to that as described in connection with Figures 2, 3 and 4 except that in the final action of returning the operating plunger to its extreme right position the flow of fluid from the accumulators is again cut off instead of being allowed to pass at zero pressure to the reservoir.

I claim:

1. The combination with a double acting hydraulic press or the like having a piston capable of limited movement in loading and unloading directions, a pump for delivering liquid under pressure and a tank or reservoir for liquid, of a full cycle hydraulic valve comprising a housing having a port for connection to the pump outlet, a port for connection to the tank and two bores, an operating plunger reciprocably mounted in one bore, a control plunger reciprocably mounted in the other bore, means biasing said plunger to one end of its bore, each plunger having lands and grooves, each bore being intersected by passages and ducts from said ports controllable and variously connectable by said grooves, a relief valve always connected by one of said ducts with the pump port, means to bias said relief valve shut and means to conduct liquid discharged from the relief valve when the pump pressure becomes excessive to said end of the second bore beyond the control plunger to move the same against said bias.

2. The combination with a double acting hydraulic press or the like having a piston capable of limited movement in loading and unloading directions, a pump for delivering liquid under pressure and a tank or reservoir for liquid, of a full cycle hydraulic valve comprising a housing having a port for connection to the pump outlet, a port for connection to the tank and two bores, an operating plunger reciprocably mounted in one bore, a control plunger reciprocably mounted in the other bore and biased to one end thereof, each plunger having lands and grooves, each bore being intersected by passages and ducts from said ports controllable and variously connectable by said grooves, a relief valve always connected by one of said ducts with the pump port, means to bias said relief valve shut, means to conduct liquid discharged from the relief valve when the pump pressure becomes excessive to one end of the second bore beyond the control plunger to move the same against its bias, and means under control of the operating plunger to vent liquid from the opposite end of the second bore to said tank port.

3. The combination with a double acting hydraulic press or the like having a piston capable of limited movement in loading and unloading directions, a pump for delivering liquid under pressure and a tank or reservoir for liquid, of a full cycle hydraulic valve comprising a housing having a port for connection to the pump outlet, a port for connection to the tank and two bores, an operating plunger reciprocably mounted in one bore, a control plunger reciprocably mounted in the other bore, each plunger having lands and grooves, each bore being intersected by passages and ducts from said ports controllable and variously connectable by said grooves, a relief valve mounted in said control plunger and always connected by one of said ducts with the pump port, means to bias said relief valve shut, means to conduct liquid discharged from the relief valve when the pump pressure becomes excessive to one end of the second bore beyond the control plunger to move the same, and means to vent liquid from the opposite end of the second bore to said tank port, said control valve being arranged to connect certain of said passages and ducts during said movement to reduce the pump pressure below that necessary to actuate the relief valve whereby movement of the control valve is stopped.

4. The combination with a double acting hydraulic press or the like having a piston capable of limited movement in loading and unloading directions, a pump for delivering liquid under pressure and a tank or reservoir for liquid, of a full cycle hydraulic valve comprising a housing having a port for connection to the pump outlet, a port for connection to the tank and two bores, an operating plunger reciprocably mounted in one bore and having a portion extending through one end thereof, a control plunger reciprocably mounted in the other bore, each plunger having lands and grooves, each bore being closed at its ends and intersected by passages and by ducts from said ports controllable and variously connectable by said grooves upon movement of the plungers, a spring biased relief valve always connected by one of said ducts with the pump port, means to conduct liquid discharged from the relief valve when the pump pressure becomes excessive to one end of the second bore to move the control plunger therein, said control plunger being arranged to connect certain of said passages and ducts during said movement to reduce the pump pressure below that necessary to actuate the relief valve whereby movement of the control plunger is stopped, said operating plunger being arranged to vent said end of the second bore to the tank when moved to the neutral position and means to return the control plunger toward said end when it is so vented.

5. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands and grooves, each bore being closed at its ends and intersected by passages and by ducts from said ports controllable and variously connectable by said grooves upon movement of the plungers, a relief valve always connected by one of said duct with the said source when the operating plunger is in the operating position, means to bias said relief valve shut, means to conduct liquid through the valve to the press, means to conduct liquid discharged from the relief valve when the pressure becomes excessive, for lack of movement of the press piston, to said end of the second bore to move the control plunger therein against its bias, said control plunger being arranged to connect by said movement certain of said passages and ducts to cause movement of the piston to reduce the liquid pressure below relief valve operating pressure to stop the movement of the control plunger, and means whereby the discharge of the relief valve is effective to return the operating plunger to neutral when the control plunger reaches a predetermined position in its bore.

6. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands and grooves, each bore being closed at its ends and intersected by passages and by ducts from said ports controllable and variously connectable by said grooves upon movement of the plungers, a relief valve always connected by one of said ducts with the said source when the operating plunger is in the operating position, means to bias said relief valve shut, means to conduct liquid through the valve to the press, means to conduct liquid discharged from the relief valve when the pressure becomes excessive, for lack of movement of the press piston to said end of the second bore, to move the control plunger therein against its bias, said control plunger being arranged to connect by said movement certain of said passages and ducts to cause movement of the piston to reduce the liquid pressure below relief valve operating pressure to stop the movement of the control plunger, said operating plunger being arranged to vent said end of the second bore to the reservoir when moved to neutral position whereby the control plunger moves toward said end.

7. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands and grooves, each bore being closed at its ends and intersected by passages and by ducts from said ports controllable and variously connectable by said grooves upon movement of the plungers, a relief valve always connected by one of said ducts with the said source when the operating plunger is in the operating position, means to bias said relief valve shut, means to conduct liquid through the valve to the press, means to conduct liquid discharged from the relief valve when the pressure becomes excessive for lack of movement of the press piston to said end of the second bore to move the control plunger therein against its bias, said control plunger being arranged to connect by said movement certain of said passages and ducts to cause movement of the piston to reduce the liquid pressure below relief valve operating pressure to stop the movement of the control plunger, said operating plunger being arranged to vent said end of the second bore to the reservoir when moved to neutral position whereby the control plunger moves toward said end, and said control plunger being arranged when moved to the opposite end of its bore to deliver pressure liquid to one end of the operating plunger bore to move this plunger to neutral position.

8. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands closely fitting the bore and grooves, each bore being closed at its ends and intersected by passages and by ducts from said ports controllable and variously connectable by said grooves upon movement of the plungers, a relief valve axially disposed in said control plunger always connected by one of said ducts with the said source when the operating plunger is in operating position, means to conduct liquid through the valve to and from the press, means to conduct liquid discharged from the relief valve when the pressure becomes excessive, for lack of movement of the press piston, to said end of the second bore to move the control plunger therein a portion of its total movement from said end, said control plunger being constructed to connect by said movement certain of said passages and ducts to cause movement of the press piston to reduce the liquid pressure below relief valve operating pressure to stop movement of the control plunger, means to repeatedly operate said control plunger by steps until it reaches its limit of movement and means including certain of said passages to then deliver liquid from the relief valve into one end of the first bore to return the operating plunger to its neutral position.

9. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands closely fitting the bore and grooves, each bore being closed at its ends and intersected by passages and by ducts from said ports controllable and variously connectable by said grooves upon movement of the plungers, a relief valve axially disposed in said control plunger always connected by one of said ducts with the said source when the operating plunger is in operating position, means to conduct liquid through the valve to and from the press, means to conduct liquid discharged from the relief valve when the pressure becomes excessive, for lack of movement of the press piston, to said end of the second bore to move the control plunger therein a portion of its total movement from said end, said control plunger being constructed to connect by said movement certain of said passages and ducts to cause movement of the press piston to reduce the liquid pressure below relief valve operating pressure to stop movement of the control plunger, means to repeatedly operate said control plunger by steps until it reaches its limit of movement, means including certain of said passages to then deliver liquid from the relief valve into one end of the first bore to return the operating plunger to its neutral position and a land on said operating plunger movable on said return to neutral position to uncover a passage between the said end of said second bore and the reservoir whereby the control plunger returns to neutral position.

10. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands closely fitting the bore and grooves, each bore being closed at its ends and intersected by passages and by ducts from said ports controllable and variously connectable by said grooves upon movement of the plungers, a relief valve axially disposed in said control plunger always connected by one of said ducts with the said source when the operating plunger is in operating position, means to conduct liquid through the valve to and from the press, means to conduct liquid discharged from the relief valve when the pressure becomes excessive, for lack of movement of the press piston, to said end of the second bore to move the control plunger therein a portion of its total movement from said end, said control plunger being constructed to connect by said movement certain of said passages and ducts to cause movement of the press piston to reduce the liquid pressure below relief valve operating pressure to stop movement of the control plunger, means to repeatedly operate said control plunger by steps until it reaches its limit of movement, means including certain of said passages to then deliver liquid from the relief valve into one end of the first bore to return the operating plunger to its neutral position and a land on said operating plunger movable on said return to neutral position to uncover a passage between the said end of said second bore and the reservoir whereby the control plunger returns to neutral position, said operating plunger having a valve to vent said end of the first bore to the reservoir, a handle for moving said operating plunger from neutral to operating position, pressure on said handle opening said last mentioned valve to permit movement of the said operating plunger.

11. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands and grooves, each bore being closed at its ends and intersected by passages and by ducts from said ports controllable and variously connectable by said grooves upon movement of the plungers, a relief valve connected by one of said ducts with the port connected to said source whenever the operating plunger is moved from the neutral position, means to bias said relief valve shut against pressures less than the maximum required on the work stroke of the press, means to conduct fluid discharged from the relief valve to one end of the second bore to move the control plunger therein, said control plunger being arranged to connect certain of said passages and ducts during successive movements to sequentially operate the press for a full cycle and thereby to reduce the pump pressure below that required to actuate the relief valve each time the press plunger moves, and means whereby final movement of the control plunger delivers liquid to one end of the first bore to return the operating plunger to neutral position.

12. The combination with a double acting hydraulic press or the like having a piston capable of limited movement in loading and unloading directions, a source of liquid under pressure and a reservoir for liquid, of a full cycle hydraulic valve comprising a housing having a port for connection to the said source, a port for connection to the reservoir and two bores, an operating plunger reciprocably mounted in one bore and manually movable from a neutral to an operating position, a control plunger reciprocably mounted in the other bore and biased toward one end thereof, each plunger having lands and grooves, each bore being closed at its ends and intersected by passages and by ducts from said ports controllable and variously connectable by said grooves upon movement of the plungers, a relief valve connected by one of said ducts with the port connected to said source whenever the operating plunger is moved from the neutral position, means to bias said relief valve shut against pressures less than the maximum required on the work stroke of the press, means to conduct fluid discharged from the relief valve to one end of the second bore to move the control plunger therein, said control plunger being arranged to connect certain of said passages and ducts during successive movements to sequentially operate the press for a full cycle and thereby to reduce the pump pressure below that required to actuate the relief valve each time the press plunger moves, means whereby final movement of the control plunger delivers liquid to one end of the first bore to return the operating plunger to neutral position, and valving means for said operating plunger to vent the liquid, used to return it to neutral, during its normal movement to operating position.

13. The combination with a double acting hydraulic press or the like having a piston capable of limited movement in loading and unloading directions, a pump for delivering liquid under pressure and a reservoir for liquid, of a full cycle hydraulic valve comprising a housing having a port for connection to the pump outlet, a port for connection to the reservoir and two bores, an operating plunger reciprocably mounted in one bore and manually movable from a neutral to an operating position, a control plunger reciprocably mounted in the other bore and biased toward one end thereof, each plunger having lands and grooves, each bore being closed at its ends and intersected by passages and by ducts from said ports controllable and variously connectable by said grooves upon movement of the plungers, a relief valve always connected by one of said ducts with the said source when the operating plunger is in the operating position, means to bias said relief valve shut, means to conduct liquid through the valve to the press, means to conduct liquid discharged from the relief valve when the pressure becomes excessive, for lack of movement of the press piston, to said end of the second bore to move the control plunger therein against its bias, said control plunger being arranged to connect by said movement certain of said passages and ducts to cause movement of the piston to reduce the liquid pressure below relief valve operating pressure to stop the movement of the control plunger, said operating plunger being arranged to vent said end of the second bore to the reservoir when moved to neutral position whereby the control plunger moves toward said end, said operating plunger having one of its grooves arranged and positioned to connect the pump port directly to the reservoir port when the plunger is in neutral position.

14. A system for the automatic cycling of a double acting hydraulic press or the like comprising in combination, a cylinder, a piston capable of limited movement in the cylinder in loading and unloading directions, a pump for delivering liquid under pressure, a tank for liquid, a port for connection to each end of said press, a cycling valve comprising a housing having a port connected to the pump outlet, a port connected to the tank and two bores, an operating plunger reciprocably mounted in one bore and having a portion extending through one end thereof for actuation of the same manually, a control plunger reciprocably mounted in the other bore, each plunger having lands and grooves, each bore being closed at its ends and intersected by passages and by ducts from said ports controllable and variously connectable by said grooves upon movement of the plungers, a spring biased relief valve carried by said control plunger and always connected by one of said ducts with the pump port, means to conduct liquid discharged from the relief valve when the pump pressure becomes excessive to one end of the second bore to move the control plunger therein, said control plunger being arranged to connect certain of said passages and ducts during said movement to the press ports in such a manner as to reduce the pump pressure below that necessary to actuate the relief valve whereby movement of the control plunger is stopped, said operating plunger being arranged to vent said end of the second bore to the tank when moved to the neutral position, and means to return the control plunger toward said end when it is so vented.

15. A system for the automatic cycling of a double acting hydraulic press or the like comprising in combination, a cylinder, a piston mounted for limited movement in the cylinder in loading and unloading directions, a source of liquid under pressure, a reservoir for liquid, a cycling valve comprising a housing having a port connected to said source, a port connected to the reservoir, a port connected to each end of the cylinder and two bores, an operating plunger reciprocably mounted in one bore and manually movable from a neutral to an operating position, a control plunger reciprocably mounted in the other bore and biased toward one end thereof, each plunger having lands closely fitting the bore and grooves, each bore being closed at its ends and intersected by passages and by ducts from said ports all controllable and variously connectable by said grooves upon movement of the plungers, a relief valve axially disposed in said control plunger always effectively connected by one of said ducts with the said source only when the operating plunger is in operating position, said passages, ducts and grooves comprising means to conduct liquid through the valve to and from the press to operate the same, means to conduct liquid discharged from the relief valve when the pressure becomes excessive, for lack of movement of the press piston, to said end of the second bore to move the control plunger therein a predetermined portion of its total movement from said end, said control plunger being constructed to connect by said movement certain of said passages and ducts to cause such movement of the press piston as to reduce the liquid pressure below relief valve operating pressure to temporarily stop movement of the control plunger, means to similarly repeatedly operate said control plunger by predetermined steps until it reaches its limit of movement, and means including certain of said passages to then deliver liquid from the relief valve into one end of the first bore to return the operating plunger to its neutral position.

WILLIAM T. STEPHENS.